(12) United States Patent
Scarlett

(10) Patent No.: US 10,394,525 B2
(45) Date of Patent: *Aug. 27, 2019

(54) GENERATION OF RANDOM NUMBERS THROUGH THE USE OF QUANTUM-OPTICAL EFFECTS WITHIN A MULTI-LAYERED BIREFRINGENT STRUCTURE

(71) Applicant: Carol Y. Scarlett, Tallahassee, FL (US)

(72) Inventor: Carol Y. Scarlett, Tallahassee, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/979,062

(22) Filed: May 14, 2018

(65) Prior Publication Data
US 2018/0260191 A1 Sep. 13, 2018

Related U.S. Application Data

(63) Continuation-in-part of application No. 15/060,144, filed on Mar. 3, 2016, now Pat. No. 9,971,568.

(60) Provisional application No. 62/128,088, filed on Mar. 4, 2015.

(51) Int. Cl.
*G06F 7/58* (2006.01)
*G06N 10/00* (2019.01)

(52) U.S. Cl.
CPC ............. *G06F 7/584* (2013.01); *G06F 7/588* (2013.01); *G06N 10/00* (2019.01)

(58) Field of Classification Search
USPC ...................................................... 708/250
See application file for complete search history.

(56) References Cited

U.S. PATENT DOCUMENTS

| | | |
|---|---|---|
| 3,432,221 A | 3/1969 | Harris |
| 3,831,108 A | 8/1974 | Le Floch |
| 4,205,268 A | 5/1980 | Eerkens |
| 4,305,046 A | 12/1981 | Le Floch et al. |
| 4,327,337 A | 4/1982 | Liu |

(Continued)

FOREIGN PATENT DOCUMENTS

| | | |
|---|---|---|
| WO | WO-03023409 A2 | 3/2003 |
| WO | WO-2004068191 A2 | 8/2004 |

(Continued)

OTHER PUBLICATIONS

International Search Report and Written Opinion, International Application No. PCT/US16/20702, dated May 26, 2016.

(Continued)

*Primary Examiner* — David H Malzahn
(74) *Attorney, Agent, or Firm* — Marshall, Gerstein & Borun LLP

(57) ABSTRACT

An optical system uses a multi-layered birefringent structure that receives an input beam that may be non-coherent or coherent, and produces a randomization energy from the input beam, by creating birefringent induced beam subdivisions as the beam passes through each birefringent layer, where after the beam has passed through a threshold number of birefringent layers, a randomized energy distribution is created. That randomized energy distribution is read by a photodetector and converted into a random number by a randomization processing device.

20 Claims, 13 Drawing Sheets

(56) References Cited

U.S. PATENT DOCUMENTS

| | | | |
|---|---|---|---|
| 4,449,825 A | 5/1984 | May | |
| 4,467,032 A | 8/1984 | Lowke et al. | |
| 4,797,893 A | 1/1989 | Dixon | |
| 4,798,952 A | 1/1989 | Fink | |
| 4,812,767 A | 3/1989 | Taketomi | |
| 4,907,235 A | 3/1990 | Kuizenga | |
| 5,121,245 A | 6/1992 | Johnson | |
| 5,142,548 A | 8/1992 | Krasinski et al. | |
| 5,233,624 A | 8/1993 | LaPlante et al. | |
| 5,272,708 A | 12/1993 | Esterowitz et al. | |
| 5,276,695 A | 1/1994 | Scheps | |
| 5,359,621 A | 10/1994 | Tsunoda et al. | |
| 5,946,090 A | 8/1999 | Tashiro et al. | |
| 5,982,174 A | 11/1999 | Wagreich et al. | |
| 6,097,488 A | 8/2000 | Grek et al. | |
| 6,249,009 B1 * | 6/2001 | Kim | G06F 7/588 250/580 |
| 6,370,168 B1 | 4/2002 | Spinelli | |
| 6,539,410 B1 * | 3/2003 | Klass | G06F 7/588 708/255 |
| 6,687,012 B2 | 2/2004 | Sanzari | |
| 7,284,024 B1 | 10/2007 | Trifonov et al. | |
| 7,535,938 B2 | 5/2009 | Luo et al. | |
| 7,800,751 B1 | 9/2010 | Silver et al. | |
| 7,817,325 B1 | 10/2010 | Uchikawa et al. | |
| 7,991,028 B1 | 8/2011 | Bruno | |
| 8,345,248 B2 | 1/2013 | Hong et al. | |
| 8,564,783 B2 | 10/2013 | Flanders et al. | |
| 9,971,568 B2 * | 5/2018 | Scarlett | G06F 7/588 |
| 2002/0009123 A1 | 1/2002 | Medlock | |
| 2002/0171905 A1 | 11/2002 | Liu et al. | |
| 2004/0131092 A1 | 7/2004 | Nakayama et al. | |
| 2004/0178348 A1 | 9/2004 | Wainer et al. | |
| 2005/0036534 A1 | 2/2005 | Baney | |
| 2005/0270439 A1 | 12/2005 | Weber et al. | |
| 2006/0115086 A1 * | 6/2006 | Beausoleil | G06F 7/588 380/263 |
| 2007/0047600 A1 | 3/2007 | Luo et al. | |
| 2007/0064748 A1 | 3/2007 | Mirov et al. | |
| 2007/0211449 A1 | 9/2007 | Holman et al. | |
| 2007/0285669 A1 | 12/2007 | Ajgaonkar et al. | |
| 2009/0290167 A1 | 11/2009 | Flanders et al. | |
| 2010/0265559 A1 | 10/2010 | Uchikawa et al. | |
| 2011/0102565 A1 | 5/2011 | Wang et al. | |
| 2012/0093179 A1 | 4/2012 | Dunn et al. | |
| 2013/0088223 A1 | 4/2013 | Konno et al. | |
| 2014/0055844 A1 | 2/2014 | Cormier et al. | |
| 2014/0204382 A1 | 7/2014 | Christensen | |
| 2014/0254125 A1 | 9/2014 | Nevitt et al. | |
| 2014/0354275 A1 | 12/2014 | Sheng et al. | |
| 2015/0193207 A1 | 7/2015 | Pooser | |
| 2016/0259625 A1 * | 9/2016 | Scarlett | G06F 7/588 |
| 2018/0260191 A1 * | 9/2018 | Scarlett | G06F 7/584 |

FOREIGN PATENT DOCUMENTS

| | | |
|---|---|---|
| WO | WO-2005060056 A1 | 6/2005 |
| WO | WO-2005096115 A1 | 10/2005 |

OTHER PUBLICATIONS

Scarlett, "Laser profile changes due to photon-axion induced beam splitting," Nuclear Instruments and Methods in Physics Research A, 722:49-54 (2013).

Scarlett, "Beam shifting due to bifurcation in a cavity environment," Nuclear Instruments and Methods in Physics Research A, 735:115-119 (2014).

Khankhasayev, et al. "Photon-axion mixing effects and mirror cavity experiments," Physical Review, D 87:125030-1-125030-7 (2013).

Scarlett, "Axion-photon coupling in the limit of photon statistics," Nuclear Instruments and Methods in Physics Research A 748:12-17 (2014).

Sofikitis, et al. "Evanescent-wave and ambient chiral sensing by signal-reversing cavity ringdown polarimetry," Nature 514(79):76-79 (2014).

International Preliminary Report on Patentability from PCT/US2016/020702 dated Sep. 5, 2017.

Non-Final Office Action, U.S. Appl. No. 15/060,144, dated Aug. 28, 2017.

Mirandi et al., "All-optical quantum random bit generation from intrinsically binary phase of parametric oscillators," Optics Express 20(17), 9 pages (2012).

Search Report from European Application No. 16759498.5 dated Feb. 22, 2019.

Zhu et al., "Random number generation based on polarization mode noise of vertical-cavity surface-emitting lasers," Laser Physics Letters 9(11):774-780 (2012).

* cited by examiner

GENERATION OF RANDOM NUMBERS THROUGH THE USE OF QUANTUM-OPTICAL EFFECTS WITHIN A MULTI-LAYERED BIREFRINGENT STRUCTURE

CROSS-REFERENCE TO RELATED APPLICATIONS

This application is a continuation-in-part of U.S. application Ser. No. 15/060,144, filed Mar. 3, 2016, and issued as U.S. Pat. No. 9,971,568 B2 on May 15, 2018, which claims the priority benefit under 35 U.S.C. § 119(e) of U.S. Provisional Application No. 62/128,088, filed Mar. 4, 2015, the disclosure of which is incorporated herein by reference in its entirety.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

The use of random numbers is almost ubiquitous in the fields of computer science and information technology. Random numbers are used to encode sensitive messages, to create simulations that mimic real, randomized events (also known as Monte Carlo simulations used in scientific computations and modeling of consumer behavior by Wall Street), for gaming applications such as lotteries, and for hosts of other applications in science and communications. Traditional random number generator (RNG) devices have made use of various electronic and optical noises to generate an initial number. In many cases, the process is slow enough that these initial number values provide only a "seed" for mathematical algorithms that ultimately produce random bits. These random bits, however, are only pseudo-random due to fundamental limitations in system design.

Currently, optical systems producing random numbers do so by using optical noise. However, the sources of noise in conventional designs, e.g. noise due to single photons passing through an optical beam splitter, show significant fluctuations due to temperature and external conditions and in many cases require subtraction of a DC signal. This means that many RNGs are only useful with circuitry (Von Neuman correctors) that corrects for significant numbers of zero bits due to low photonic count rates or filtering of non-random backgrounds that are typically orders of magnitude bigger than the desired effect. Such RNG devices may also exhibit slow speeds, as the system must wait for noise levels to rise above some thresholds.

As electronic devices have become faster, cheaper and parallel in operations, there remains significant interest in producing truly random numbers in a manner not subject to operating conditions or the need for pseudo-random algorithms.

SUMMARY OF THE INVENTION

The present technology provides alternative techniques for producing random bits, techniques that overcome numerous deficiencies associated with conventional RNGs. The present techniques use a beam source, which initially may be highly coherent and exhibit very low noise (e.g., a laser source), and through repeated interactions with a birefringent medium generate randomized light output. Devices may be used to rotate the state of polarization of the light, maintaining a "mixed quantum state" (relative to the axes of a birefringent medium) that results in the light output exhibiting a noise. This enhanced noise, random beam output may be read by a single cell or pixelated photodetector. Each pixel experiences a distinct set of randomized energy fluctuations thereby giving a bit stream that is inherently both random and parallel in nature.

In some examples, a mirror cavity may be used that includes either an optical delay or Fabry-Perot setup. The cavity reflects the light back-and-forth through a birefringent material within the cavity, along with polarization rotating elements. This forces the beam within the cavity to continuously divide according to its polarization axis (along directions parallel and perpendicular) relative to the material's birefringent axis, as it pass through the cavity. As the beam subdivides, the energy associated with each new division is half that of each previous division. Such a reduction can continue only as long as the number of photons (the indivisible unit of energy associated with the light entering the cavity) is greater than one. Once a statistical limit is reached, i.e., a limit determined by taking the total input beam energy and dividing by the energy for a single photon $[E=(h\omega/2\pi)]$, the photons in the cavity randomly walk as each acquires a random amount of transverse momentum. From this random walking, the device generates a randomized energy distribution that is then measured by a photodetector.

In other examples, the cavity configuration is replaced with a multi-layered birefringent structure to create a single pass randomization system. In such examples, the birefringent structure is formed of a plurality of abutting layers, each subsequent layer having a birefringent axis that is miss-aligned with the previous incident layer. In such a configuration light will undergo a similar splitting each surface, followed by being in a rotated state relative to the next layer such that further splitting at the next layer will occur, and eventually bifurcation occurs producing a randomization energy from structure.

In accordance with an example, a randomization generating optical system comprises: an optical cavity formed of a first mirror and a second mirror, wherein the first mirror is configured to receive into the cavity a beam from a beam source, and wherein the first mirror and the second mirror are positioned to propagate the beam over a plurality of roundtrip traversals of the cavity; a plurality of polarizer elements within the cavity and a birefringent medium positioned within the optical cavity to receive the beam and produce a new subdivided beam at least each roundtrip traversal thereby forming an increasing bifurcating beam within the cavity, and in response to polarization selection or rotation induced by one or more of the plurality of polarizer elements; wherein the optical cavity is configured to retain the beam and the increasing bifurcating beam within the cavity for a randomization threshold number of roundtrip traversals of the cavity, such that after the randomization threshold number of roundtrip traversals has occurred a randomized energy is generated in the cavity, and wherein the cavity is configured to release the generated randomized energy out of the cavity; and a photodetector positioned to receive the randomized energy from the cavity and convert the randomization energy into a parallel randomized output signal.

In accordance with another example, a method for generating a randomization, the method comprises: receiving, into an optical cavity, a beam from a beam source; retaining the beam in the optical cavity of a plurality roundtrip traversals of the optical cavity; subdividing the beam, each roundtrip traversal, by passing the beam through a birefringent medium and through a plurality of polarizer elements, such that the beam impending upon the birefringent medium is subdivided into additional beams to collectively form a bifurcating beam within the cavity; retaining the bifurcating beam within the cavity, until a threshold number of roundtrip traversals have occurred with the cavity, after which a randomized energy is generated in the cavity from the bifurcating beam; detecting the randomized energy at a photodetector; and producing a parallel randomized output signal from the randomized energy detected at the photodetector.

BRIEF DESCRIPTION OF THE DRAWINGS

The accompanying drawings, which are incorporated in and constitute a part of this disclosure, illustrate various embodiments of the present device. These drawings include.

DETAILED DESCRIPTION

The present techniques apply birefringence to generate a randomized energy or light output from an incident beam of light, which may or may not be initially coherent. Optical birefringence phenomena occurs when a material divides an incoming unpolarized or polarized beam of light into two distinct states depending on the direction of the incoming electric field and the alignment of the material's atomic structure. Birefringence materials have already found use in random number generators in the form of beam splitters that randomly deflect a single photon, in a "mixed quantum (polarization) state," to one direction or another. These devices are single stage devices, operating on one photon, which means they are inherently impractical for applications in which a significantly large randomized bit stream is needed, as is the case for most computing applications. Moreover, even the randomization of one photon at a time has questionable utility, because the techniques often produce high rates of zero bits, which must be corrected.

Figure 1:
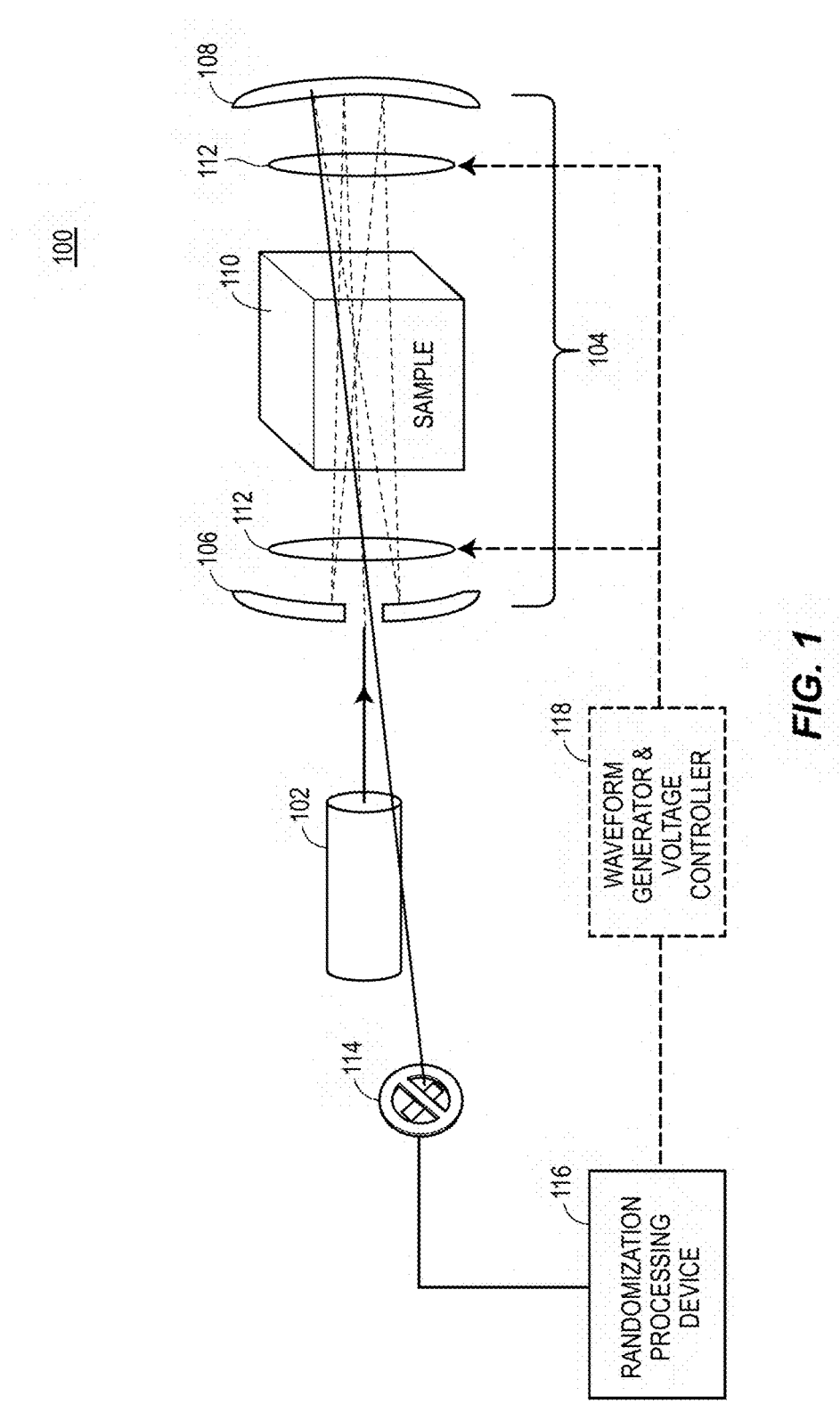
FIG. 1 is a schematic of an optical system for creating randomization, in accordance with an example.

FIG. 1 illustrates an optical system 100 having a beam source 102 and an optical cavity 104 defined by a first cavity mirror 106 and a second cavity mirror 108. The beam source 102 may be a non-coherent beam source such as, by way of example, an arc lamp, flashtube, electric spark, electrodeless lamp, excimer lamp, fluorescent lamp, high-intensity discharge lamp, hollow-cathode lamp, induction lighting, neon lamp, and argon lamp, plasma lamp, Xenon flash lamp, a bulb using various filaments or gases, and even sunlight. In other examples, including that illustrated, the beam source 102 may be a coherent beam source, such as a Diode laser, a VCSEL array, or a laser utilizing gas tubes, solid-state structures, fiber optics, photonic crystals, semiconductors, dyes, free-electrons or other exotic media, whether operated continuously (CW) or pulsed (q-switched, mode-locking or pulse pumping). The beam source 102 may produce beam emissions in the visible, near infrared, mid infrared, long infrared, violet, or other suitable spectrum regime. Moreover, in some examples, the beam source may include beam emissions over a plurality of wavelengths components, where each wavelength component may be separately randomized by the optical system, for example, when using multiple different photodetectors.

In the illustrated example, the beam source 102 produces a beam incident on the cavity 104 and introduced into the cavity through the mirror 106 which may be partially transparent to external beams or which may have a bore hole (as shown) or which may be impinged upon as the beam makes a non-90° angle to the axis of the cavity 104. That is, in some examples, the incident beam from the beam source 102 enters through an input bore hole in the first mirror 106 and exits from the cavity 104 through the same input bore hole. In other examples, the incident beam may exit through an exit bore hole in the mirror 108 on the opposite side of the cavity, as shown in the optical system 100' in FIG. 2 (bearing the same reference numerals, except for mirror 108' which has an exit bore hole, whereas mirror 108 does not). The input angle of the input beam and the exit angle of randomization energy may be different in some examples and they may be the same (or approximately the same) in other examples. The size of the exit hole may be chosen to coincide with the beam spread of the randomized energy generated by the optical system 100.

With the cavity 104 is a birefringent medium 110, such as a calcite, quartz, ruby, rutile, sapphire, silicon carbide, tourmaline, zircon, magnesium fluoride, lithium niobate, ice, beryl barium borate, borax, Epsom salt, mica—biotite, mica—muscovite, olivine, perovskite, topaz, ulexite and materials with inducible birefringence through interaction with an external magnetic field. The birefringent medium 110 may be characterized by the difference between two refractive indices giving rise to both a fast and slow axes. These distinct refractive indices cause an incoming beam to split in two; the separation of the outgoing beams being a function of the difference between these indices ($\Delta n = n_e - n_o$).

The birefringent medium 110 is positioned between two polarizer elements (plates) 112, which may have polarization axes that are aligned with one another, orthogonal to one another, or angled with respect to one another. These polarizer elements may be linear polarizers or circular polarizers, for example. In some examples, these polarizer plates 112 are instead waveplates that provide partial polarization state rotation as beams traverse the cavity 104. In yet other examples, these polarizers are rotatable elements, including, for example, electrically rotatable liquid crystal plates. That is the polarization axes of the polarizer plates 112 may be fixed during operation to achieve randomization; while in other examples, the plates 112 may rotate during operation such that their polarization axes change during the randomization process. One may use the changing polarization axes, for example, to embed information within a randomized energy output, as discussed further below.

Although not shown, in some examples, the cavity 104 would further contain elements such as: a photon-detector embedded at some position along one of the mirror surfaces, nematic crystal gel along the surface of the birefringent material that can be used to imprint information through altering the polarization of some or all of the photons in the beam or other materials that focus or refract the beam before it is allowed to exit the cavity. These elements could be combined into layers, as a single material consisting of a central birefringent material with outer layers of polarization rotators or focusing elements, or held separately in place through a mechanical structure.

Figure 3:
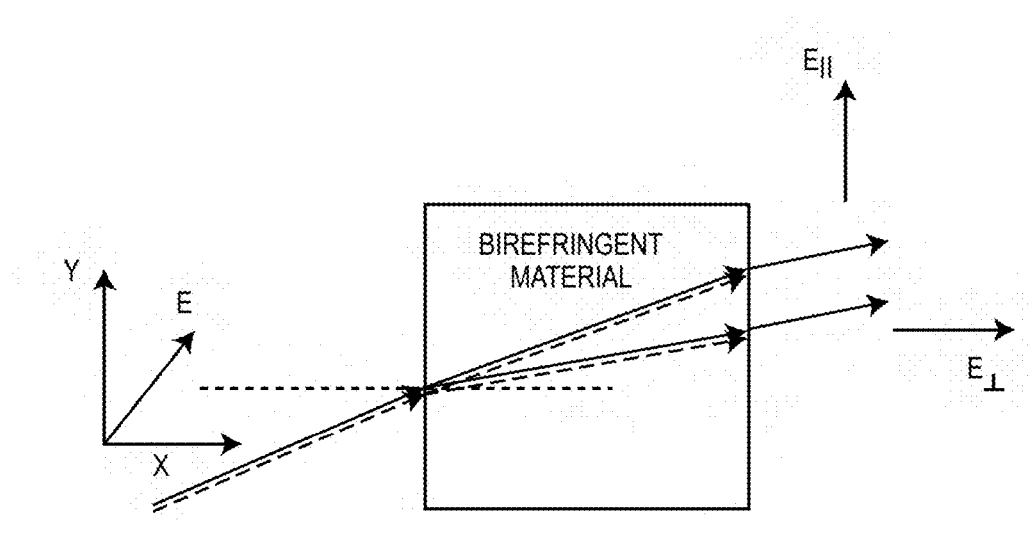
FIG. 3 illustrates how the beam is split upon traversing a birefringent sample as in FIGS. 1 and 2, when the beam enters the sample material with a polarization that represents a "mixed-quantum" state relative to the birefringent medium axis for subdivision, in accordance with an example.
Figure 4:
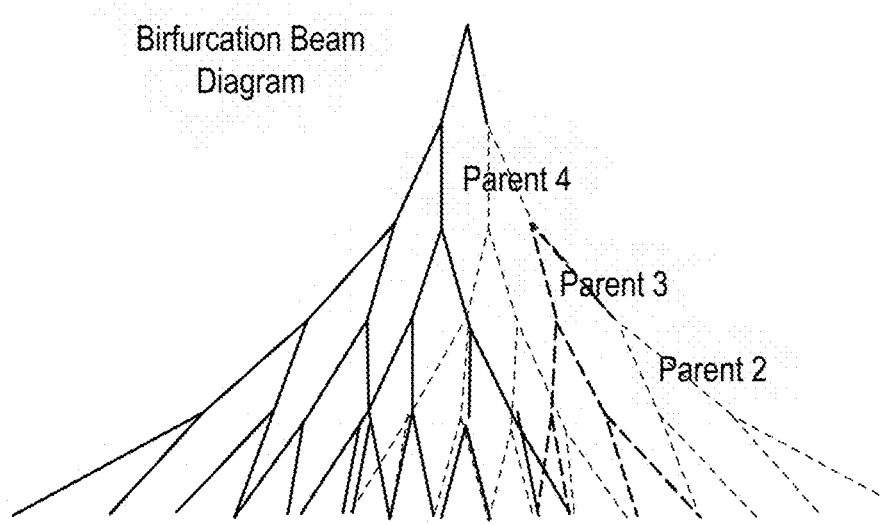
FIG. 4 illustrates a beam bifurcation process for continuously splitting a beam in the optical systems of FIGS. 1 and 2, in accordance with an example.

In operation, the mirrors 106, 108 form a reflective cavity that forces the incoming beam to interact repeatedly with the enclosed birefringent medium 110. As such, the cavity 104 may be configured as an optical delay or Fabry-Perot cavity (e.g., FIG. 9), depending primarily on the degree of birefringence of the central medium. The birefringent medium 110 divides the energy of the incoming beam in multiple beams, as shown in FIG. 3. The polarization plates 112 rotate the polarization of the incident beam, to maintain a "mixed-quantum" state relative to the birefringence axis of the medium 110, and divided beams are generated each traversal. This configuration thus allows the beam energy to subdivide with each traversal of the cavity 104. That is, the polarization plates 112 may have a polarization axis that is at angle with respect to a y-axis that is orthogonal to the cavity axis. For example, the polarization plates 112 may form an angle of 22.5° in relation to the y-axis, although any non-0°, acute angle may be used to create a polarization rotation. FIG. 3 illustrates the subdivision of the incident beam on a birefringent medium. The incident beam is subdivided into two new states: one along the birefringent axis of the medium and the other perpendicular to the birefringent axis of the medium, in accordance with an example. As the beam within the cavity traverses the cavity, as shown in FIG. 4, a beam bifurcation process takes place, the cavity continuously splits the beam generating new polarization based subdivided beams. That is, the initial input beam traverses the cavity and each roundtrip, or each single trip depending on the configuration, generates an increasing number of beams, also termed a bifurcating beam, that grows, as shown in FIG. 4.

The beams exiting the birefringent medium each traversal (see, e.g., FIG. 3) will have been separated into two beam components with perpendicular polarization states. Depending on the angle of the polarization axes for the plates 112, each traversal these beam components will each see further splitting after they enter the birefringent medium; and this process will continue and grow at least until a randomization threshold is reached and a randomization energy has been generated. For configurations like that of FIGS. 1 and 2 where the polarization axes of the plates 112 are rotated relative to the polarization axis of these beam outgoing beam components before each traversal the splitting occurs each one way trip of the cavity or twice each round trip. However, for configurations in which one of the polarization axes of plates 112 is held constant along a 45° angle relative to one of the beam component's polarization axes, the splitting occurs with each round trip. Furthermore, the amount of splitting in a round trip can be adjusted from one traversal to the next by controlling operation of the polarizers or of the polarization rotators, e.g., by connecting the LC rotation elements to a variable voltage supply.

As shown in FIG. 4, with each traversal, the initial beam has its energy subdivided (bifurcation) until the scale of the individual photon is reached. Once this occurs, the photons acquire random transverse momentum. This causes the intensity of the beam, exiting the cavity and impinging on the photo-detector, to fluctuate at a scale very different from other types of fluctuations or optical noise. This induced noise scales with the total beam output and not the square-root of the total output as seen in shot noise; giving the generated energy a significantly distinct signature as well as numerical advantage over shot noise devices. The generated energy has a randomized distribution, e.g., the output beam intensity at the photo-detector is random (noise). For a pixelated detector, that noise appears at each pixel simultaneously and can be readout in parallel.

In other words, optical systems 100 and 100' are examples of a technique to create an improved use of birefringence for purposes of random number generation (RNG). In a single encounter, beam that is initially unpolarized or in a "mixed-quantum" (polarization) state leaving a birefringent medium, as in FIG. 3, will have been divided into two distinct polarization states along axes defined by the medium. Simply reflecting this beam through the same medium would normally produce little added effect and in the case of circular birefringence the initial splitting may even be undone. However, the present techniques provide for continuous rotation of the beam within a cavity, wherein polarization of the beam is rotated each traversal and in such a manner that beam splitting occurs continuously within the cavity. As the beam splitting increases, however, a randomization threshold is reached, after which randomization energy is generated within the cavity. That randomization energy is then harnessed and used outside the cavity to generate an entire area of parallel randomization, which may be detected by a photodetector.

After a threshold number of passes through the cavity (e.g., $E_{beam} \sim 2^{(number\ of\ traversals)}$), the incident beam has been converted to a randomized energy distribution, which is then removed from the cavity 104 and provided to a photodetector 114, for example, a pixelated array photodetector.

The randomized energy distribution may be removed from the cavity 104 through a number of techniques, including through a partially reflecting surface, an aperture or bore hole, or from a side of a mirror, e.g., if flat mirrors are used. In a Fabry-Perot cavity configuration (see, FIG. 9), one cavity mirror is highly reflective and the other partially reflective allowing the beam to enter and exit through the partially reflecting mirror for removing the randomized energy from the cavity. In some implementations of the optical system 100, only randomization energy will escape the cavity 104. Although, in some examples external filtering may be performed on the randomization energy output from the cavity, for example, if the output has some non-random components. This filtering may be achieved through a physical filter with the cavity 104 or external to it. In some examples, this filtering may be achieved through a photodetector, for example, by setting the DC level of each pixel to a certain level or performing an averaging over a time period for each pixel, or allowing each pixel a saturation time period before collecting an intensity measurement at the pixel.

Figure 2:
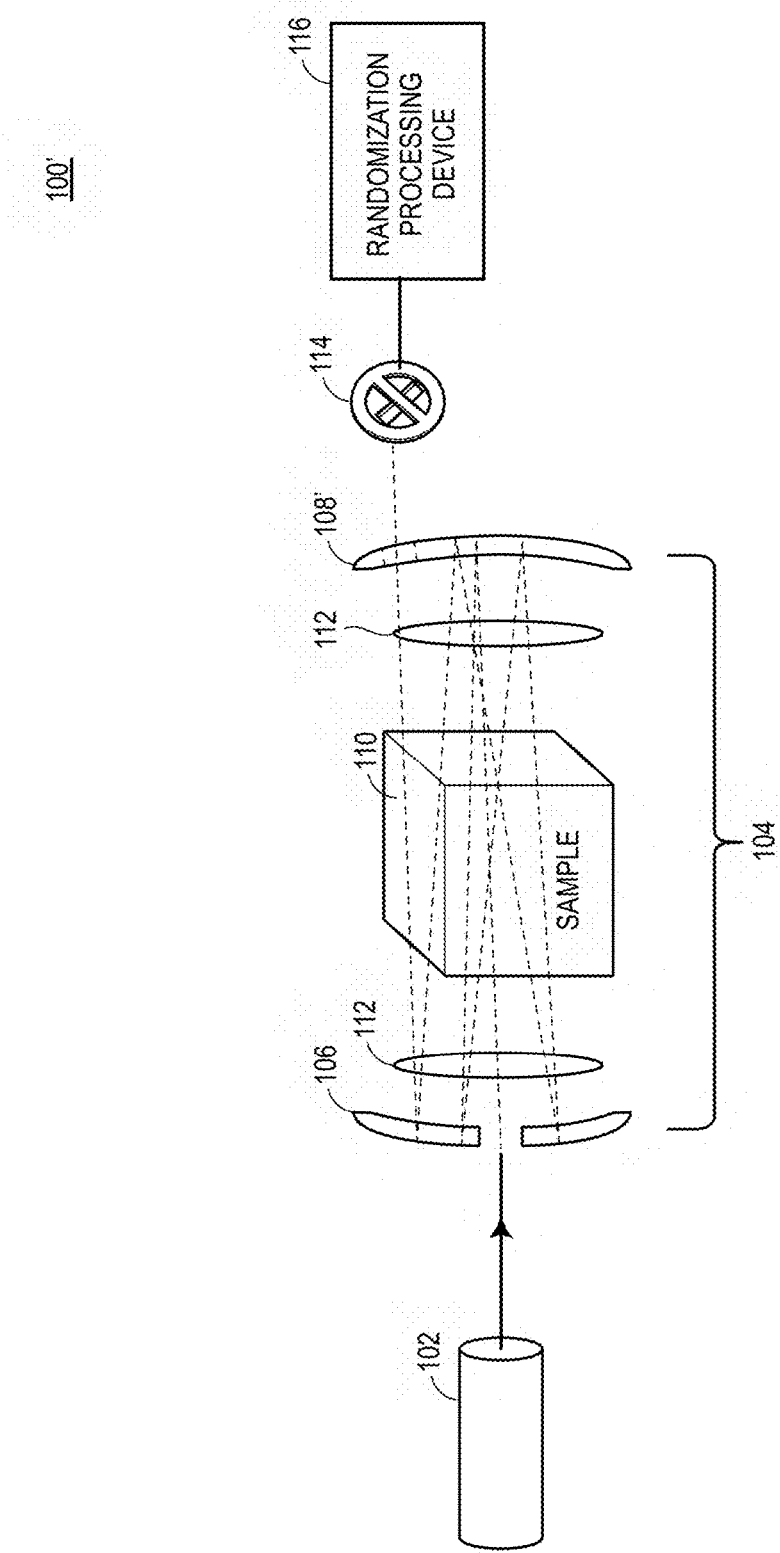
FIG. 2 is a schematic of another optical system for creating randomization, in accordance with another example.

In configurations based on an optical delay where a beam is introduced through either a hole in one mirror or at an angle to the side of the mirror, as in the examples of FIGS. 1 and 2, the beam traverses the cavity until it either traces back to the point of entrance where it can also escape or until the beam traverses the cavity and escapes through a hole or side of the opposite cavity mirror. These examples work particularly for the case of curved mirrors.

Figure 5:
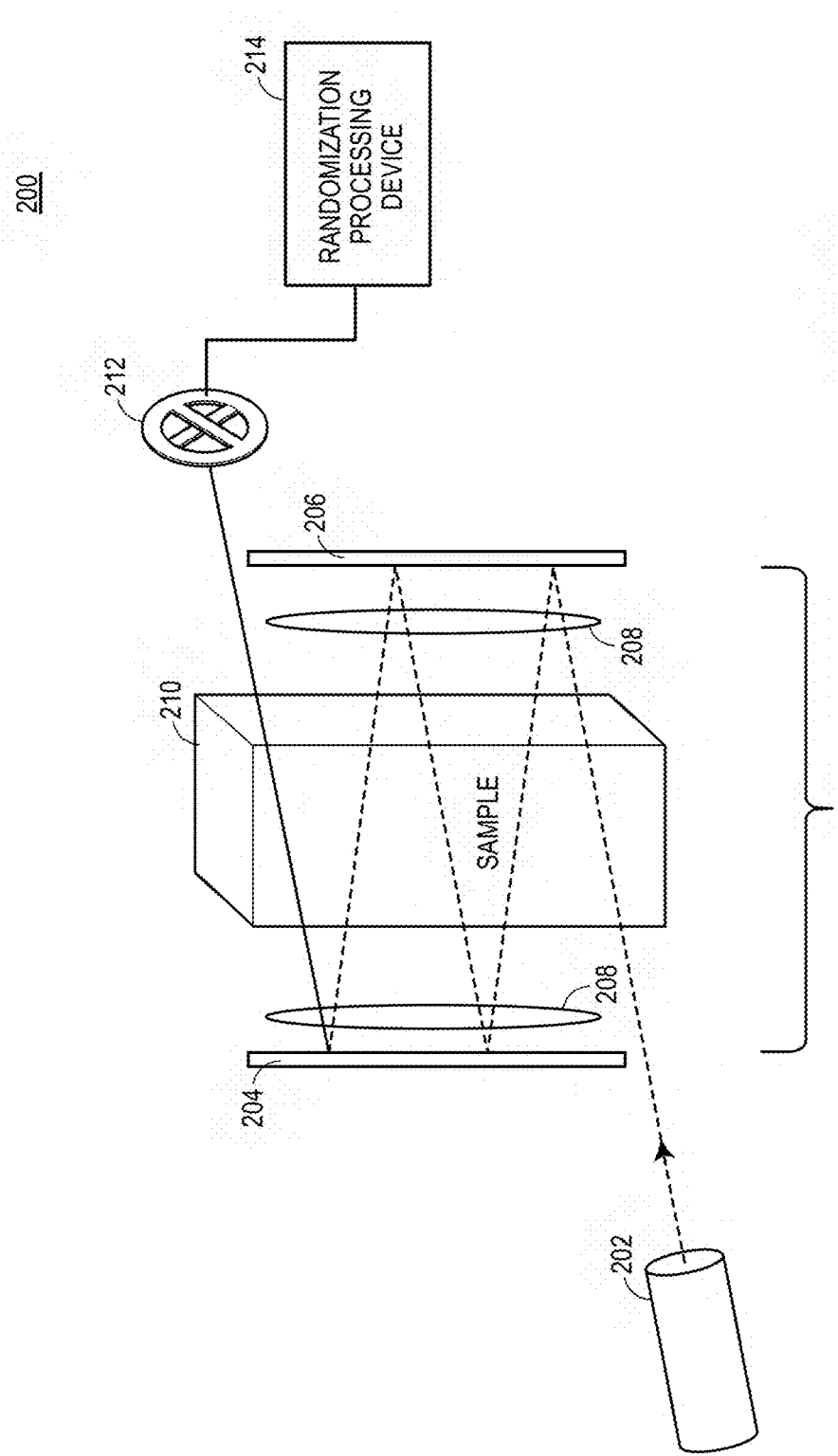
FIG. 5 is a schematic of an optical system for creating randomization using flat mirrors, in accordance with an example.
Figure 6:
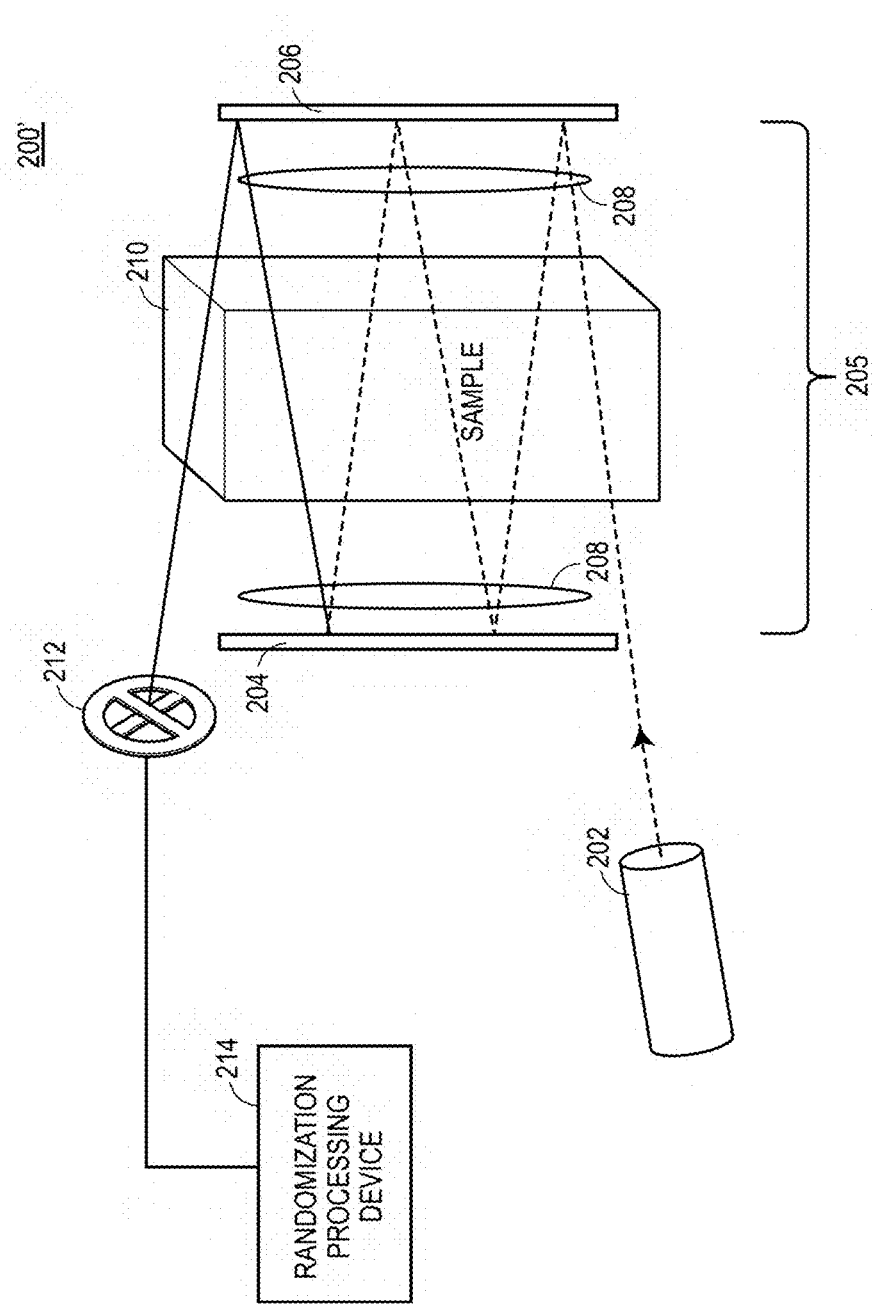
FIG. 6 is a schematic of another optical system for creating randomization using flat mirrors, in accordance with another example.

FIGS. 5 and 6 illustrate other example configurations of an optical system for generating randomization. In the optical system 200 of FIG. 5, a beam source 102 provides the incident beam from an angle and from outside an outer edge of a first cavity mirror 204, which is flat and which defines a cavity 205 with a second cavity mirror 206, which is also flat, and parallel to the first mirror 204. Two polarization plates 208 are provided surrounding a birefringent medium 210. The plates 208, like the plates 112, may be polarizers or waveplates or liquid crystal plates or any other suitable polarizer, with fixed or rotatable polarization axes. These polarizers may be linear polarizers, although in other examples, they may be circular polarizers. For cavities formed of the flat mirrors 204, 206, the beam will simply walk out of the cavity due to the geometry. The beam enters at a non-90° angle at the bottom left of the cavity then after some number of traversals exits from the top left, then the randomized energy rays impinge onto a photodetector 212 connected to an image processing device 214. FIG. 5 shows the optical system 200 with the photodetector 212 on one side of the system. FIG. 6 shows the photodetector 212 on the other side (and is thus labeled 200').

The optical systems 100 and 200 generate a randomized energy that is characterized by random statistical noise (at a level of the square-root of the number of photons emerging), as well as random beam energy on the scale proportional to the number of photons. The beam energies fluctuate between 0 and a maximum value. To convert this optical randomized energy to a randomized digital signal, the photodetectors 114 and 212 are electrically coupled to a randomization processing device 116 and 214, respectively. These randomization processing devices 116/214 may be achieved as processors embedded with the photodetectors 114 and 212 (416 as well, of course), respectively, such as a readout circuit or other processor. Or the processing devices 116/214 may be a separate device such a desktop computer, laptop computer, workstation, or the like. In some examples, the processing device 116 may be coupled to the photodetector 114 through a wired or wireless connection. In some examples, the processing devices 116/214 are coupled to the photodetectors 114/212 through a communications network, where for example, the processing device 116/212 may be located remotely on a server or other location.

Figure 7A:
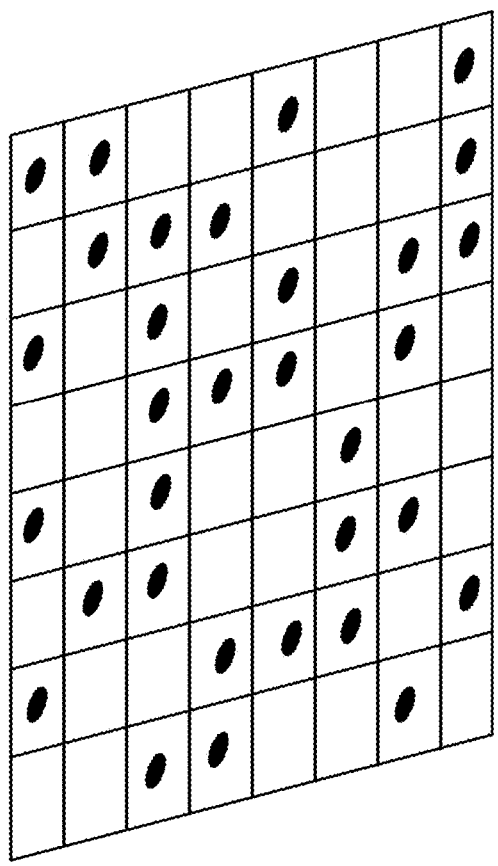
FIGS. 7A and 7B illustrate two different randomized energy pixel patterns on a photodetector, in accordance with an example.
Figure 7B:
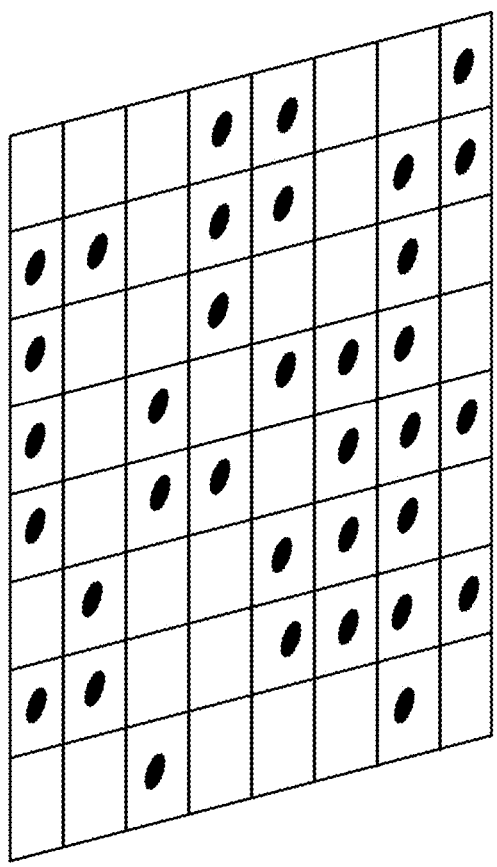

The pixel array of the photodetectors 114/212 receives the randomization energy from the cavity 104/205 and each pixel produces a digital output signal, either a "1" or a "0". Each pixel produces an output signal in parallel, such that collectively the pixels produce parallel pixel output signals. These parallel pixel output signals may be produced continuously or each read cycle of the corresponding photodetector. Collectively these parallel pixel output signals form a parallel randomized output signal of the corresponding photodetector. A 12×12 pixel array, for example, if entirely illuminated by the randomization energy could produce a maximum of 144 parallel output signals, that is a parallel randomized output signal formed of 144 different values, which a randomizing processor may then convert into a random number of N bits, where N is equal to or less than 144, e.g., 128 bits. FIG. 7A illustrates a first randomized energy pixel pattern on the photodetector 114/212. The randomized energy pattern may be read out continuously, e.g., if a CW beam source is used, or the pattern may be readout periodically, e.g., if a pulsed beam source is used. As long as the beam is allowed to enter the cavity, as long as the laser is powered, the pattern will continue to change and update automatically for each time the photodetector is accessed for readout. FIG. 7B illustrates another example randomized energy pattern taken at another point in time.

The energy of the outgoing beam is electronically recorded and converted into a series of "1" and "0" bits which are recorded by the processing devices 116/214. The processing devices 116/214 then will generate a random number of N bits in length from the values recorded by the pixels of the photodetectors 114/212. That bit length N may be the same as the number of pixels of the photodetectors 114/212 or it may be some subset of the total number of pixels. In some examples, N is an integer number equal to $2^n$ (2, 4, 8, 16, 32, 64, 128, 256, etc.). The random number is then stored on one or more non-transitory, computer readable memories of the processing devices 116/214/416. The processing devices herein may include one or more processes, one or more memories storing instructions executable by the one or more processors. These devices may include input/output connectors for connecting to peripherals such as input devices (keyboards, keypads, etc.), displays, as well as to portable devices and other processing devices. The devices may include network interfaces for coupling to communication networks through wired or wireless communications. The processing devices 116/214 can access the photodetectors 114/212 at any desired time and obtain a new random number, especially in the case of a CW operated beam source, as the randomization changes continuously. It will be appreciated that the photodetector may buffer its readout so as to store the detected randomization pixel values in a memory that may be accessed by the processing devices 116/214. The techniques herein can also be implemented as special purpose logic circuitry, e.g., an FPGA (field programmable gate array) or an ASIC (application specific integrated circuit), by way of further examples. Processors suitable for the execution of a computer program include, by way of example, both general and special purpose microprocessors, and any one or more processors of any kind of digital computer. Generally, a processor will receive instructions and data from a read only memory or a random access memory or both. A computer will include a processor for performing instructions and one or more memory devices for storing instructions and data. Generally, however, a computer may also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

By using a pixelated photodetector to capture the energy output, the random distribution can provide a parallel set of bits for use in encryption of sensitive information, simulations of noise (e.g. in Monte Carlo simulations of various systems), and any application requiring random number generation. That is, each pixel corresponds to a different bit that is random. Therefore, each bit of the N-bit random number is truly random.

As discussed briefly above, in some examples, the polarization axes of the polarizer elements may be electrically (or mechanically) controlled to rotate during operation; the axes may even be oscillated. For example, liquid crystal rotators may be used as the polarization plates 112. These liquid crystal rotators can be held fixed in polarization orientation. However, in other examples, an applied voltage may be used to alter the polarization axis of the elements providing further control over the beam splitting within the cavity. FIG. 1 shows an example implementation, with an optional waveform generator and voltage controller 118 controlled by the randomization processing device 116 to send a modulated voltage signal to control rotation of the polarizer elements 112. With such a configuration, the applied voltage may be sinusoidally increased or decreased, using a perturbation signal applied to a control voltage, to produce a change in the degree of polarization rotation. The amount of rotation, the rate of rotation, and the modulation waveform, may all be controlled depending on the characteristics of the optical cavity, the cavity roundtrip time, the current number of traversals, the threshold number of traversals needed to achieve randomization energy, and any other suitable physical factors. The modulated voltage signal may be controlled to impart desired information on the randomized energy, information such as encoded header that may be used by a trusted receiver station to validate the transmitting source of a randomized number. In any event, even in examples in which a polarization plate or waveplate is used; these elements may be mounted on mounting stages that can rotate the polarizer elements thereby adjusting their orientation. Such mechanical rotation may be by hand or be electrical control over the mounting stages.

In examples such as these, where the actual polarization orientation of the polarizer elements is adjusted that adjustment may occur continuously or periodically, and in a timed manner depending on the roundtrip times of the cavity, the amount of birefringence, and other factors. Such control over the polarization orientation can introduce what we term a cyclo-stationary signal overlaid with a random output. This cyclo-stationary signal maybe a modulated signal, for example, embedded within the randomized energy generated by the optical system.

Figure 8:
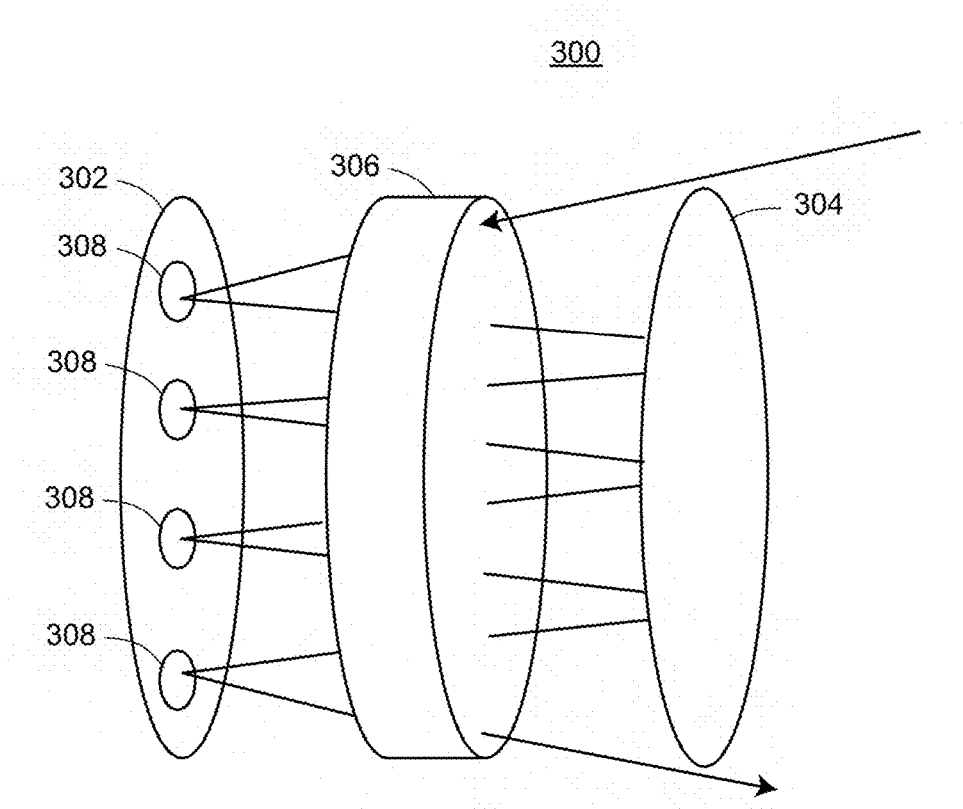
FIG. 8 is a schematic of a birefringent medium and optical cavity formed of segmented polarizers, in accordance with an example.

Polarization rotators may be achieved as a single pair of rotators on either side of the birefringent medium 210, as in the configurations of FIGS. 1 and 2, or they may be separated into several segments that intercept the beam's path through the cavity, as shown in FIG. 8, which illustrates an example implementation 300 of segment polarization rotators. Two flat mirrors 302, 304 surround a birefringent medium 306. Traversing the surface of at least one of the mirrors is a plurality of polarization rotators segments 308 (only a representative number of which are shown), each one positioned to interact with an incident beam corresponding to a particular traversal of the cavity between the two mirror 302, 304. Each traversal would experience a polarization rotator segment as the beam walks up the diameter of the mirrors. Depending on the geometry, some beams may impinge upon the same polarization rotator 308 over multiple traversals before graduating sufficiently transversely to the next polarization rotator segment 308. In the segmented approach, each polarization rotator segment 308 may operate the same producing the same polarization rotation, or each may be individually controlled. The size of the segments 308 can be set based on the beam shape and width and number of traversals to reach the randomization threshold. Implemented as liquid crystals or otherwise, the segments 308 may be mounted to a mechanical structure that spaces the segments to maximize incidence of the beam spot in the center of the segment, and as may be determined by the incident angle. While not shown, matching pairs of segments may be formed for the mirror 304, as well.

In any event, the optical systems herein, using rotating polarizers can control the intensity of any cyclo-stationary signal, i.e., the signal modulated on top of the randomization energy (noise) embedded in the final output and used for encoding bits. Because one or more of the polarizers can be varied, the noise produced by an optical system can be modulated, as an added feature. A cyclo-stationary signal would allow the user to send out at a predetermined frequency a modulated noise. A recipient would detect that noise modulation to determine if the signal received following the noise has been sent by a particular sender. In the optical system, at least one of the rotators may be continuously rotated during randomization. In other examples, two or more (if segmented) of the rotators will be continuously rotated during randomization.

The resulting overlaid signals (cyclo-stationary signal) may provide a way to validate the recipient of encrypted information through verification of transmission at some previously assigned or agreed upon frequency. For example, a transmitting station may include an optical system randomizer as described herein. That transmitting station may generate a random number then transmit that random number to a receiving station, for example, through a wired electrical connection or through a wireless connection over a network, whether that network is secured, unsecured, or partially secured. The random number may be transmitted with secondary data determined from a cyclo-stationary signal embedded within the original randomization energy used to generate the random number. That secondary data may be embedded within the random number in such a manner that third parties cannot detect what part of the random number contains that secondary data. A validated recipient, however, who has that secondary data, e.g., a recipient who knows the waveform used to modulate the polarization axes during the randomization process, will be able to identify the secondary data within the random number, for verification purposes, to confirm that that the number is from a valid transmitting station. That is, whether sinusoidal or otherwise, the exact overlaid (or perturbation) waveform applied to the voltage may be communicated separately from a transmitting device or source to a receipt device. Or, in other examples, the recipient device may store the overlaid waveform and use that waveform to decrypt a received signal. The overlaid sinusoidal signal may further be used to alert a recipient of some threat or to perform a quick check of instruments in the field to assess their randomization processes.

Figure 9:
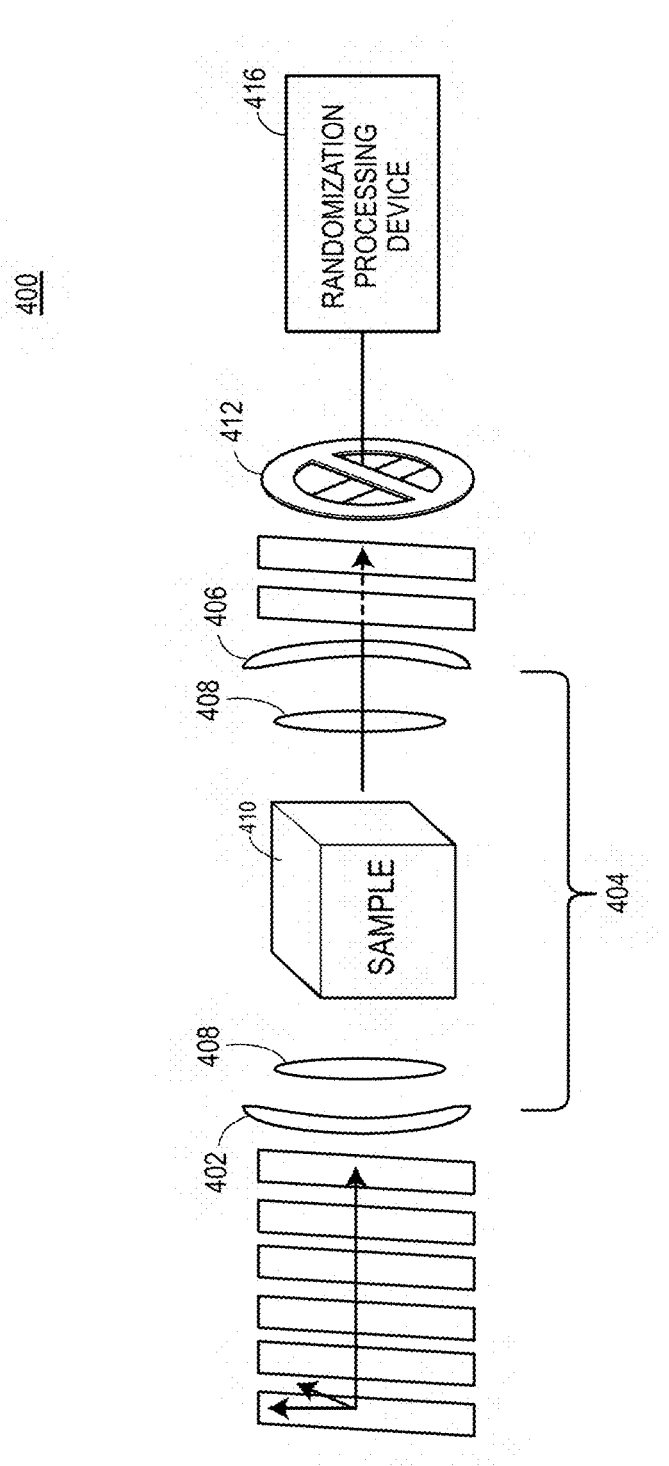
FIG. 9 illustrates an optical system for randomization having a Fabry-Perot configuration, in accordance with an example.

FIG. 9 illustrates another optical system 400 that is in a Fabry-Perot configuration. An input beam (from a beam source not shown=) impinges on a first focusing mirror 402 which is partially reflective and which forms a cavity 404 with a second partially reflective mirror 406. Thus, the input beam is introduced into the cavity 404 through the partial reflectivity of a mirror and not through a bore hole. The same is true of the generated randomized energy and how it exits. In the illustrated example, the reflectivity of the mirror 402 may be substantially higher than the reflectivity of the mirror 406. Polarizer plates 408 are shown on opposite sides of a birefringent sample 410. The randomization energy output is provided to a photodetector 412 coupled to a randomization processing device 416.

We have shown randomization generators based on optical birefringence, which is used to redistribute photonic energy of an optical beam (e.g. a laser beam or any other source) through birefringent splitting that is made to occur with each traversal of the beam through an optical system. To assure splitting with each pass, the beam polarization is rotated using optical elements also placed within the cavity. Rotators such as, but not limited to, liquid crystals (LC) may be used to maintain the "mixed-quantum" state needed for operation. The splitting induces randomization of the beam energy once the statistical limit for the number of photons associated with the incoming beam source is reached. In an example, if a 1 W input beam is used, there are approximately $6*10^{18}$ photons available and after some 63 traversals of a birefringent material dividing the energy a total of $2^{63}$ (~$6*10^{+18}$) times, any photon remaining in the cavity and continuously rotated into a mixed state will start to acquire random transverse momentum (i.e., random walking) so that the output energy distribution retains none of the original predictable, coherent properties of the input beam. The number of traversals needed to reach this randomization threshold is determined by $E_{beam} \sim 2^{(number\ of\ traversals)}$.

The present techniques are thus capable of producing: i) a generated sequence that provides true randomness with no dependence on pseudo-random, mathematical algorithms; ii) parallel bit streams (important to parallel computing) of randomization that may be readout onto a photodetector; iii) very rapid bit production (limited mainly by readout times from the detector) as is required for many industrial purposes; and iv) the ability to alter the rotation of the beam source's polarization to provide a modulated signal or cyclo-stationary feature not available on other types of random number generators.

Figure 10:
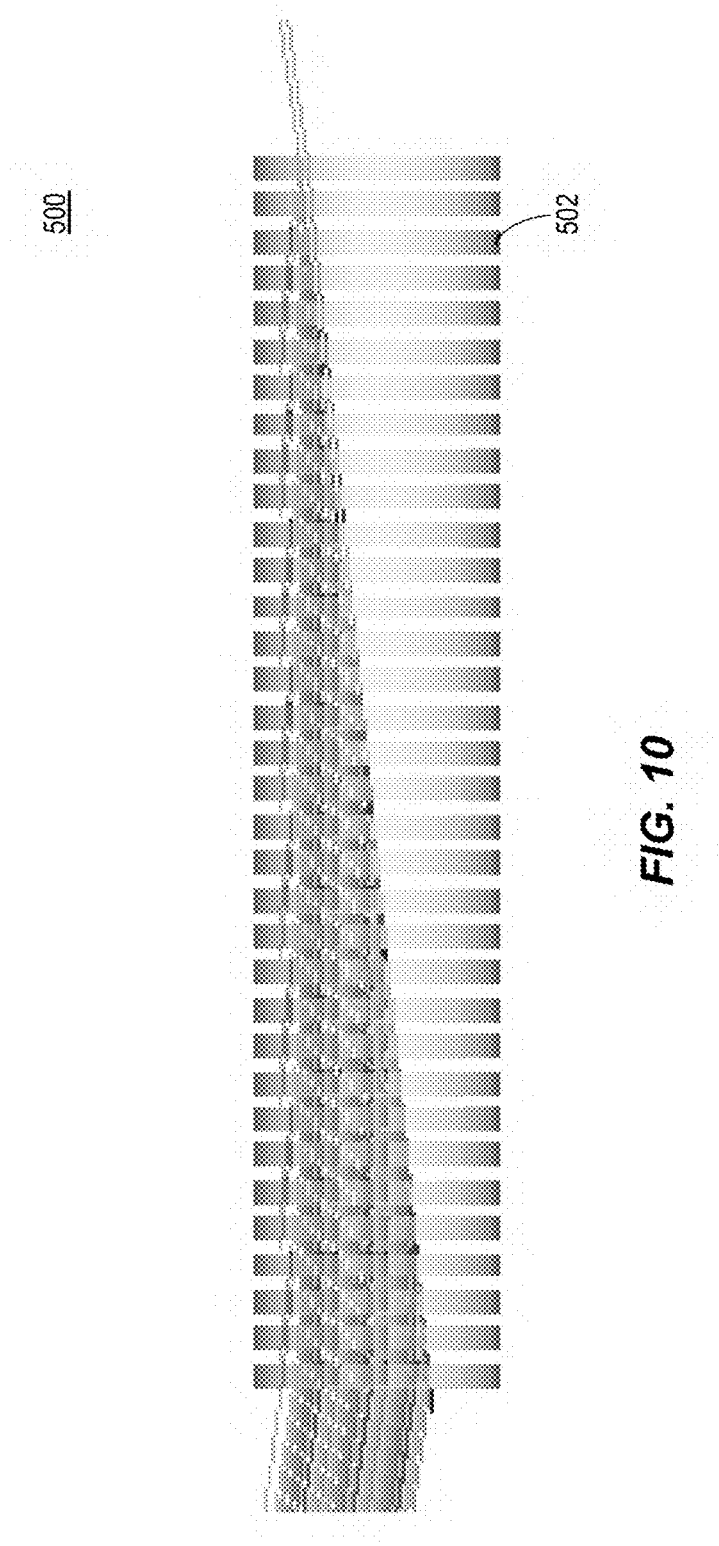
FIG. 10 illustrates a single pass, optical system for randomization, in accordance with an example.

In other examples, the cavity configuration is replaced with a multi-layered birefringent structure to create a single pass randomization system as shown in FIG. 10. In the system 500, a birefringent structure 502 is formed of a plurality of abutting layers, each subsequent layer having a birefringent axis that is miss-aligned with the previous incident layer. In such a configuration, a beam will undergo a similar splitting each surface, followed by a rotated state relative to the next layer such that further splitting at the next layer will occur, and eventually bifurcation occurs producing a randomization energy from structure. For the layered system 500 to produce bifurcation that leads to random walking, the layering of the structure 502 may further include a large scale liquid crystal or other controlled polarizer embedded in the layers.

Figure 11:
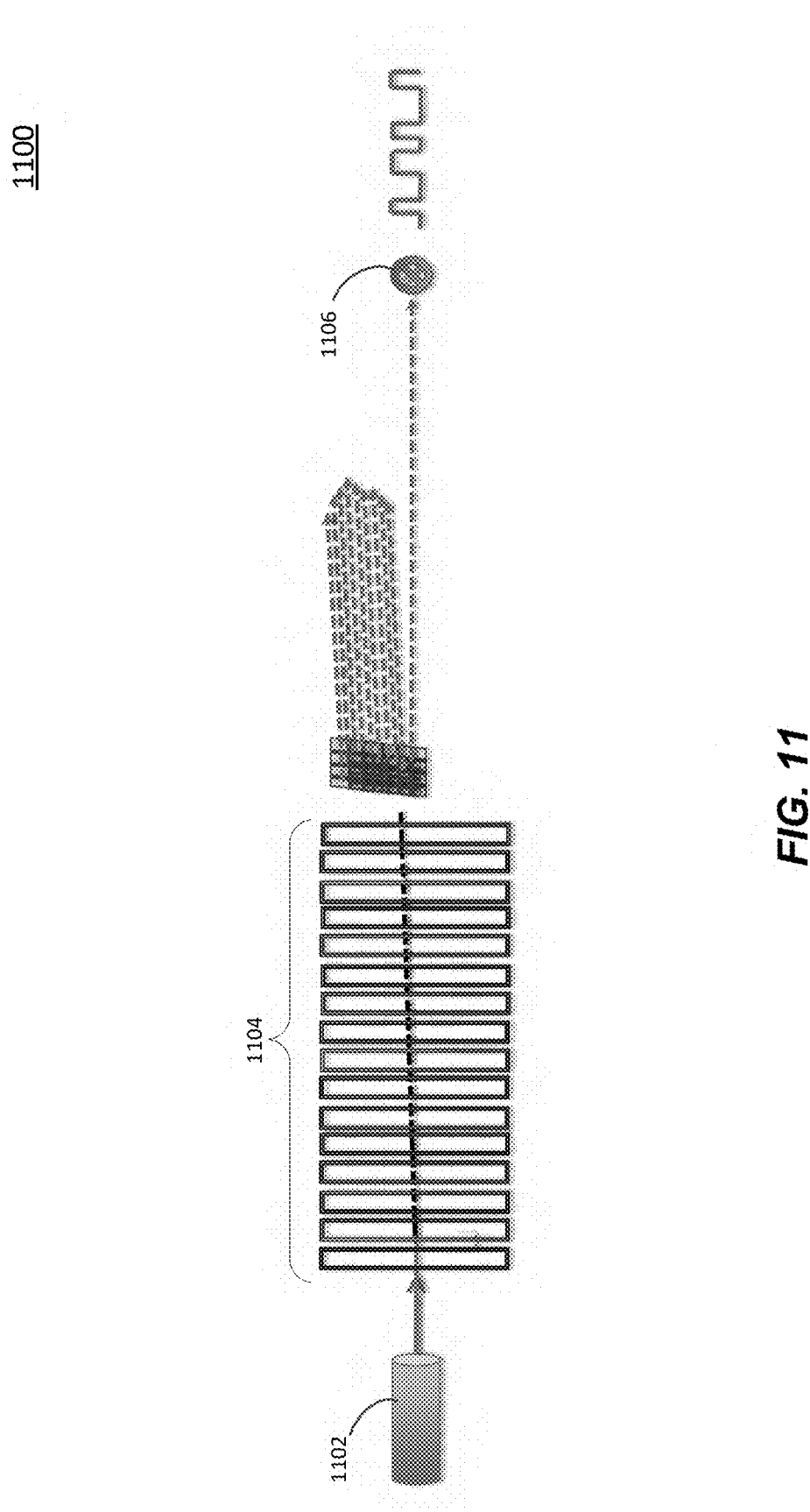
FIG. 11 is a schematic of a single pass, optical system for creating randomization, in accordance with an example.

FIG. 11 is a schematic of a single pass randomization system. As shown in FIG. 11, an optical system 1100 includes a beam source 1102 and a multi-layered birefringent structure 1104 defined by a series of layers of birefringent material. The beam source 1102 produces a beam incident on the multi-layered birefringent structure 1104 and through each subsequent layer therein before exiting the multi-layered birefringent structure 1104 as randomization energy. The randomized energy distribution is then removed from the multi-layered birefringent structure 1104 and provided to a photodetector 1106 (which may be, for example, a pixelated array photodetector) for distribution of simultaneous random streams of numbers. The input angle of the input beam and the exit angle of randomization energy may be different in some examples and they may be the same (or approximately the same) in other examples. The size of the exit beam may be chosen to coincide with the beam spread of the randomized energy generated by the optical system 1100.

The beam source 1102 may be a non-coherent beam source such as, by way of example, an arc lamp, flashtube, electric spark, electrodeless lamp, excimer lamp, fluorescent lamp, high-intensity discharge lamp, hollow-cathode lamp, induction lighting, neon lamp, and argon lamp, plasma lamp, Xenon flash lamp, a bulb using various filaments or gases, and even sunlight. In some examples, the beam source 1102 may be a coherent beam source, such as a Diode laser, a VCSEL array, or a laser utilizing gas tubes, solid-state structures, fiber optics, photonic crystals, semiconductors, dyes, free-electrons or other exotic media, whether operated continuously (CW) or pulsed (q-switched, mode-locking or pulse pumping). The beam source 1102 may produce beam emissions in the visible, near infrared, mid infrared, long infrared, violet, or other suitable spectrum regime. Moreover, in some examples, the beam source may include beam emissions over a plurality of wavelength components, where each wavelength component may be separately randomized by the optical system, for example, when using multiple different photodetectors.

The layers of the birefringent structure 1104 may be made of birefringent materials (e.g., calcite, quartz, ruby, rutile, sapphire, silicon carbide, tourmaline, zircon, magnesium fluoride, lithium niobate, ice, beryl barium borate, borax, Epsom salt, mica—biotite, mica—muscovite, olivine, perovskite, topaz, ulexite, etc.). In other examples, the layers of the birefringent structure 1104 may be made of materials that can be induced to become birefringent to light (transitional metals, plastics or other homogeneous membranes that can be stretched along one direction to induce birefringence).

Figure 12:
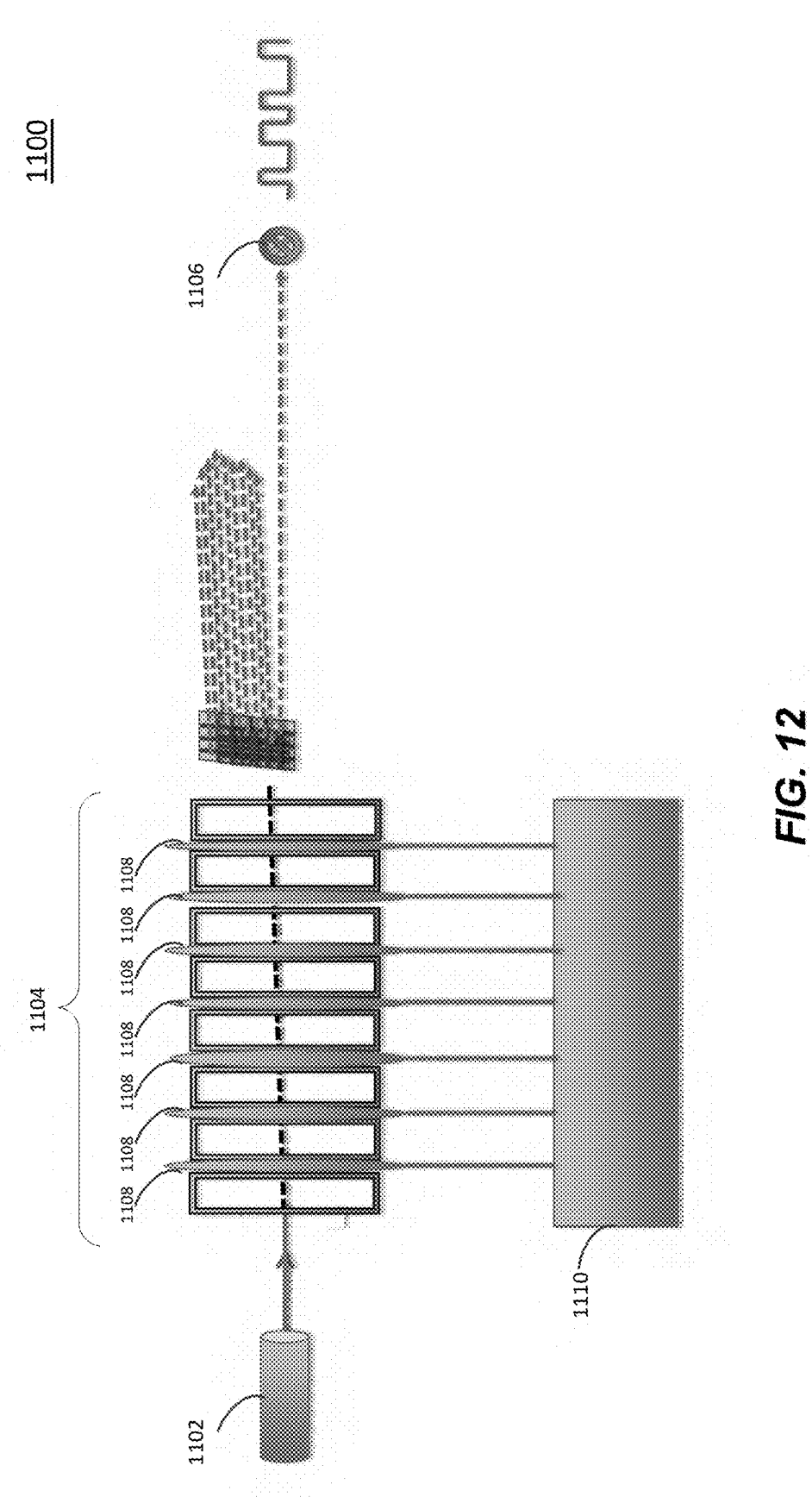
FIG. 12 is a schematic of another single pass, optical system for creating randomization, in accordance with another example.

To ensure that as the photons of the beam exit one layer of the birefringent structure 1104, they enter the next layer in a "mixed-quantum" state, the layers of the multi-layered birefringent structure 1104 may be configured to have alternating directions of polarization. For example, the birefringent axis of each layer may be rotated (e.g., 45 degrees) from the axis of each subsequent layer, in a direction perpendicular to light produced from the beam source 1102. Alternatively, for example in configurations where all birefringent axes are aligned, the birefringent layers of the structure 1104 may include polarizers inserted between each birefringent layer such that the angles of the polarizer axes are rotated relative to the angles of birefringence for the birefringent material layers. For example, as shown in FIG. 12, polarizers 1108 are inserted between each layer of the birefringent structure 1104. In some instances, polarizers 1108 may be further utilized either to calibrate or impose a signature of a particular device, which has some applications in cryptography. For example, a Physically Unclonable Function (PUF) in the form of an embedded signal may be imparted on the photon emission traversing the birefringent structure by imposing a signature on the control of the polarizer axes through modulation. The polarizers 1108 may be controlled via, e.g., a mechanical gear system configured to rotate the polarizing layers, leaving the birefringent material in place. Alternatively, the polarizers 1108 may be controlled by liquid crystals manipulated by an applied voltage. In either case, a controller 1110 coupled to the polarizers 1108 will control the polarization axes. A polarizer 1108 may be separate from and positioned between birefringent layers of the structures 1104, or each layer may be formed with an integrated polarizer (not shown). In any case, a photon exiting one layer will enter the next layer with its polarization not along either birefringent axis.

The beams exiting each layer of the multi-layered birefringent structure 1104 will have been separated into two beam components with perpendicular polarization states. With each layer, these beam components will each see further splitting after they enter the next birefringent layer. This process will continue and grow at least until a randomization threshold is reached and a randomization energy has been generated. The amount of splitting in a single layer can be adjusted by, e.g., controlling one or more of the thickness of each layer, the angle of each layer's birefringent or polarization axis relative to the previous layer, and/or the incident angle for light entering the system.

While, generally speaking, passing the light beam through even a single birefringent layer (e.g., a single layer of calcite) leads to some measurable degree of quantum randomness, a greater number of layers generally leads to a greater degree of quantum randomness due to the greater number of beam splits as the light beam passes through each layer. Moreover, increasing the number of layers tends to decrease the effects of classical sources of noise (e.g. temperature fluctuations, electrical interference, stray electromagnetic fields, etc.) on the resulting randomness. That is, an increased number of layers can increase the noise due to random walking of photons compared to the noise due to such classical sources of noise. In one example, as few as 8 layers of 1 mm thick Calcite (which has a birefringence of 0.172) may be used to increase noise due to random walking of photons to the level of other sources of noise. When using materials with lower birefringence, however, either thicker layers or additional layers may be used to reach the same level of noise due to random walking of photons. Similarly, when using materials with higher birefringence, such as, e.g., transitional metals or calcite, thinner layers or fewer layers may be used to reach the same level of noise due to random walking of photons.

As an additional consideration, thicker layers, a larger number of layers, and/or increasing the spacing between layers may result in a thicker multi-layered birefringent structure 1104. Consequently, a device including a very thick multi-layered birefringent structure 1104 may be rather large, and may be limited to use in cluster, High Performance Computers (HPCs) or other sizable machines, while a device including a thinner multi-layered birefringent structure 1104 (e.g., made of transitional metals or calcite) may be more suitable for personal use. Furthermore, layers made of highly birefringent transitional metals may in some instances be made to be thin enough to enable chip scale truly-random number generator devices.

After the beam passes through threshold number of layers (e.g., $E_{beam} \sim 2^{(number\ of\ traversals)}$) of the birefringent structure 1104, the incident beam is converted to a randomized energy distribution. The randomness of the randomized energy distribution may be both spatial and temporal. That is, the photons start off in a Gaussian beam, that is coherent, with well-known spatial positioning, and correlated in time. As the beam interacts with the birefringent layers, the photons are scattered according to polarization so that they emerge both specially and temporally randomized.

The randomized energy distribution is then removed from the multi-layered birefringent structure 1104 and provided to a photodetector 1106 (which may be, for example, a pixelated array photodetector). Consequently, when the photons are collected in a 2D array on a photon detector, the energy deposited will show large random fluctuations in intensity (i.e., unlike the original beam where the intensity varies from one position to another, but with a Gaussian drop off from a well-defined center). For example, the light exiting onto the pixelated optical detector may in turn be converted into a parallel randomized output signal, from which a processor may produce a random number of N bits.

In some instances, the detector receiving the randomized energy distribution may vary depending on the intended results, e.g., producing quantum-random numbers with noise above a certain level, embedding a signal, etc. Moreover, in some examples, 2D array photodetectors may be used to capture a random number in an instant (e.g., a 12×12 array with 144 pixels and randomness equating to a 144 bit random number or word), while in other examples, a single detector may be configured to record a time window long enough to measure 144 bits of detected random photons.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (e.g., code embodied on a machine-readable medium or in a transmission signal) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connects the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of the example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but also deployed across a number of machines. In some example embodiments, the processor or processors may be located in a single location (e.g., within a home environment, an office environment or as a server farm), while in other embodiments the processors may be distributed across a number of locations.

The performance of certain of the operations may be distributed among the one or more processors, not only residing within a single machine, but also deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one and the singular also includes the plural unless it is obvious that it is meant otherwise.

This detailed description is to be construed as an example only and does not describe every possible embodiment, as describing every possible embodiment would be impractical, if not impossible. One could implement numerous alternate embodiments, using either current technology or technology developed after the filing date of this application.

What is claimed:

1. A randomization generating optical system comprising:
a birefringent structure configured to receive a beam from a beam source, the birefringent structure comprising a plurality of layers,
wherein each layer has a birefringent axis that is misaligned with a birefringent axis of each previous layer, and
wherein each layer of the birefringent structure is positioned to split the beam as it propagates through the birefringent structure, forming an increasingly bifurcated beam; and
a photodetector positioned to receive randomization energy generated by the bifurcated beam exiting the birefringent structure and convert the randomization energy into a parallel randomized output signal.

2. The randomization generating optical system of claim 1, further comprising:
   a randomization processing device coupled to receive the parallel randomized output signal from the photodetector and having one or more processors and one or more memories storing instructions that when executed cause the one or more processors to:
   read the parallel randomized output signal form the photodetector; and
   produce a random number of N bits from the parallel randomized output signal.

3. The randomization generating optical system of claim 2, wherein the one or more memories store further instructions that, when executed, cause the one or more processors to access the photodetector continuously to continuously collect different parallel randomized output signals.

4. The randomization generating optical system of claim 2, wherein the one or more memories store further instructions that, when executed, cause the one or more processors to access the photodetector periodically or in response to a control signal, each access resulting in a different parallel randomized output signal.

5. The randomization generating optical system of claim 1, wherein the photodetector is a pixelated photodetector formed of an array of pixels, wherein at least some of the pixels in the array receive the randomized energy simultaneously to produce parallel pixel output signals, each random, and that collectively form the parallel randomized output signal.

6. The randomization generating optical system of claim 1, wherein each of the plurality of layers of the birefringent structure includes an embedded polarizer element.

7. The randomization generating optical system of claim 6, wherein the embedded polarizer elements are electrically controllable, liquid crystal polarizer elements.

8. The randomization generating optical system of claim 6, wherein the plurality of polarizer elements comprises a plurality of electrically controllable polarizer rotators, the optical system further comprising a processing device electrically coupled to at least one of the plurality of electrically controllable polarizer rotators to apply a perturbation signal to a voltage control signal for the at least one of the electrically controllable polarizer rotators, thereby forming a cyclo-stationary signal on top of the randomization energy.

9. The randomization generating optical system of claim 8, wherein the plurality of electrically controllable polarizer rotators comprises liquid crystal polarizer rotators.

10. The randomization generating optical system of claim 8, wherein the plurality of electrically controllable polarizer rotators comprises polarizers or waveplates with an orientation that is adjustable through an electrically controlled mounting stage.

11. A method for generating a randomization, the method comprising:
   receiving, into a birefringent structure comprising a plurality of layers, wherein each layer has a birefringent axis that is misaligned with a birefringent axis of each previous layer, a beam from a beam source;
   subdividing the beam, by passing the beam through the layers of the birefringent structure, such that the beam impending upon the birefringent structure is subdivided into additional beams to collectively form an increasingly bifurcating beam;
   detecting, by a photodetector, randomization energy generated by the bifurcated beam exiting the birefringent structure; and
   producing a parallel randomized output signal from the randomization energy detected at the photodetector.

12. The method for generating a randomization of claim 11, further comprising:
   reading, in a randomization processing device, the parallel randomized output signal from the photodetector; and
   producing a random number of N bits from the read parallel randomized output signal.

13. The method for generating a randomization of claim 12, the method further comprising:
   accessing the photodetector continuously to continuously collect different parallel randomized output signals.

14. The method for generating a randomization of claim 12, the method further comprising:
   accessing the photodetector periodically or in response to a control signal, each access resulting in a different parallel randomized output signal.

15. The method for generating a randomization of claim 11, wherein the photodetector is a pixelated photodetector formed of an array of pixels, the method further comprising:
   simultaneously receiving, by at least some of the pixels in the array, the randomized energy to produce parallel pixel output signals, each random, and that collectively form the parallel randomized output signal.

16. The method for generating a randomization of claim 11, wherein each of the plurality of layers of the birefringent structure includes an embedded polarizer element.

17. The method for generating a randomization of claim 16, wherein the embedded polarizer elements are electrically controllable, liquid crystal polarizer elements.

18. The method for generating a randomization of claim 16, wherein the plurality of polarizer elements comprises a plurality of electrically controllable polarizer rotators, the method further comprising:
   electrically controlling at least one of the polarizer elements to apply a perturbation signal to a voltage control signal for the at least one of the electrically controllable polarizer rotators, thereby forming a cyclo-stationary signal on top of the randomization energy.

19. The method for generating a randomization of claim 18, wherein the plurality of electrically controllable polarizer rotators comprises liquid crystal polarizer rotators.

20. The method for generating a randomization of claim 18, wherein the plurality of electrically controllable polarizer rotators comprises polarizers or waveplates with an orientation that is adjustable through an electrically controlled mounting stage.

* * * * *

UNITED STATES PATENT AND TRADEMARK OFFICE
CERTIFICATE OF CORRECTION

PATENT NO. : 10,394,525 B2
APPLICATION NO. : 15/979062
DATED : August 27, 2019
INVENTOR(S) : Carol Y. Scarlett Page 1 of 1

It is certified that error appears in the above-identified patent and that said Letters Patent is hereby corrected as shown below:

In the Claims

At Column 17, Line 8, "signal form the" should be -- signal from the --.

Signed and Sealed this
Twenty-fourth Day of March, 2020

Andrei Iancu
*Director of the United States Patent and Trademark Office*